United States Patent [19]

Heckelman et al.

[11] 4,318,005
[45] Mar. 2, 1982

[54] DIGITAL ANTI-THEFT LOCKING CIRCUIT

[76] Inventors: James D. Heckelman, R.R. 1 Old State Rd., Norwalk, Ohio 44857; Robert A. Ziemke, 1813 Sandusky St., Sandusky, Ohio 44870

[21] Appl. No.: 79,167

[22] Filed: Sep. 26, 1979

Related U.S. Application Data

[63] Continuation-in-part of Ser. No. 870,338, Jan. 18, 1978, abandoned.

[51] Int. Cl.³ .......................... H02J 1/00; H02J 13/00
[52] U.S. Cl. ................................. 307/10 AT; 307/115
[58] Field of Search .................. 307/10 AT, 115, 140; 340/63, 64, 147 MD; 361/171, 172

[56] References Cited

U.S. PATENT DOCUMENTS

| | | | |
|---|---|---|---|
| 3,515,340 | 6/1970 | Mika | 361/172 |
| 3,611,287 | 10/1971 | Hoff | 340/63 |
| 3,754,148 | 8/1973 | Nye | 340/63 |
| 3,766,400 | 10/1973 | Walters | 307/10 AT |
| 3,812,403 | 5/1974 | Gartner | 307/10 AT |
| 4,158,874 | 6/1979 | Ellsberg | 307/10 AT |

*Primary Examiner*—Lawrence R. Franklin
*Assistant Examiner*—S. D. Schreyer
*Attorney, Agent, or Firm*—William Preston Hickey

[57] ABSTRACT

An object of the present invention is the provision of a new and improved vehicle anti-theft device wherein electrical switches are located in the operator compartment of the vehicle and must be actuated in proper sequence to transmit simple make or break functions through wires leading to electronic circuitry that is located in a locked area, and which controls the ignition circuit. Additional code actuated circuitry is provided to permit authorized personnel, e.g. parking attendants, to operate the vehicle.

11 Claims, 4 Drawing Figures

DIGITAL ANTI-THEFT LOCKING CIRCUIT

This is a continuation in part of parent application Ser. No. 870,338 filed Jan. 18, 1978 abandoned.

TECHNICAL FIELD

The present invention relates to an inexpensive and improved automotive anti-theft device of the type which requires the knowledge of a particular code that must be fed into an improved electrical circuit before the vehicle can be operated.

BACKGROUND OF THE INVENTION

A number of systems have been suggested heretofore for an automotive anti-theft device wherein a code is entered into an electronic circuitry which when it matches a preselected code, will energize the ignition system or some other vital system of the automotive vehicle. One of the problems of systems which have been suggested heretofore is that a malfunction of the electronic circuitry for handling the coded information will stop the vehicle while it is operating, and so presents a very dangerous situation. Another problem of some prior art circuitries of the type with which we are concerned, is that their code can be deciphered by analyzing the conductors leading to the locked area from unlocked areas.

An object of the present invention is the provision of a new and improved vehicle anti-theft device wherein electrical switches are located in the operator compartment of the vehicle and must be actuated in proper sequence to transmit simple make or break functions through wires leading to electronic circuitry that is located in a locked area, and which in turn energizes the gate of a vehicle enabling silicon-controlled rectifier that remains actuated so long as current flows through the anode of the silicon-controlled rectifier, and regardless of what happens to the enabling circuitry of the gate.

Another object of the present invention is the provision of a new and improved anti-theft system that does not require a parking attendant to know or use any part of the logic system.

Another object is the provision of a new and improved anti-theft system wherein a minimum of power switches and circuitry is required.

Another object of the invention is the provision of a new and improved anti-theft system wherein the outputs of a plurality of switches are fed to logic circuitry housed in the locked area and wherein the circuitry outside of the locked area can not be tested to reveal the code necessary to actuate the system.

A further object of the present invention is the provision of a new and improved device of the immediately above described type wherein a make-break function of the switches in the operator compartment are directly connected to the clock terminals of flipflops which advance the actuating signal sequentially to the gate of a silicon-controlled rectifier and which resets the flip-flops whenever they are actuated out of order, or another switch is actuated.

A still further object of the present invention is the provision of time delay means for a 4-switch sequence which makes the second, third and fourth switches of the sequence faster actuating than is the first switch.

Further objects and advantages of the invention will become apparent to those skilled in the art to which the invention relates from the following description of the preferred embodiments described with respect to the accompanying drawings.

DESCRIPTION OF THE PREFERRED EMBODIMENTS

Figure 1:
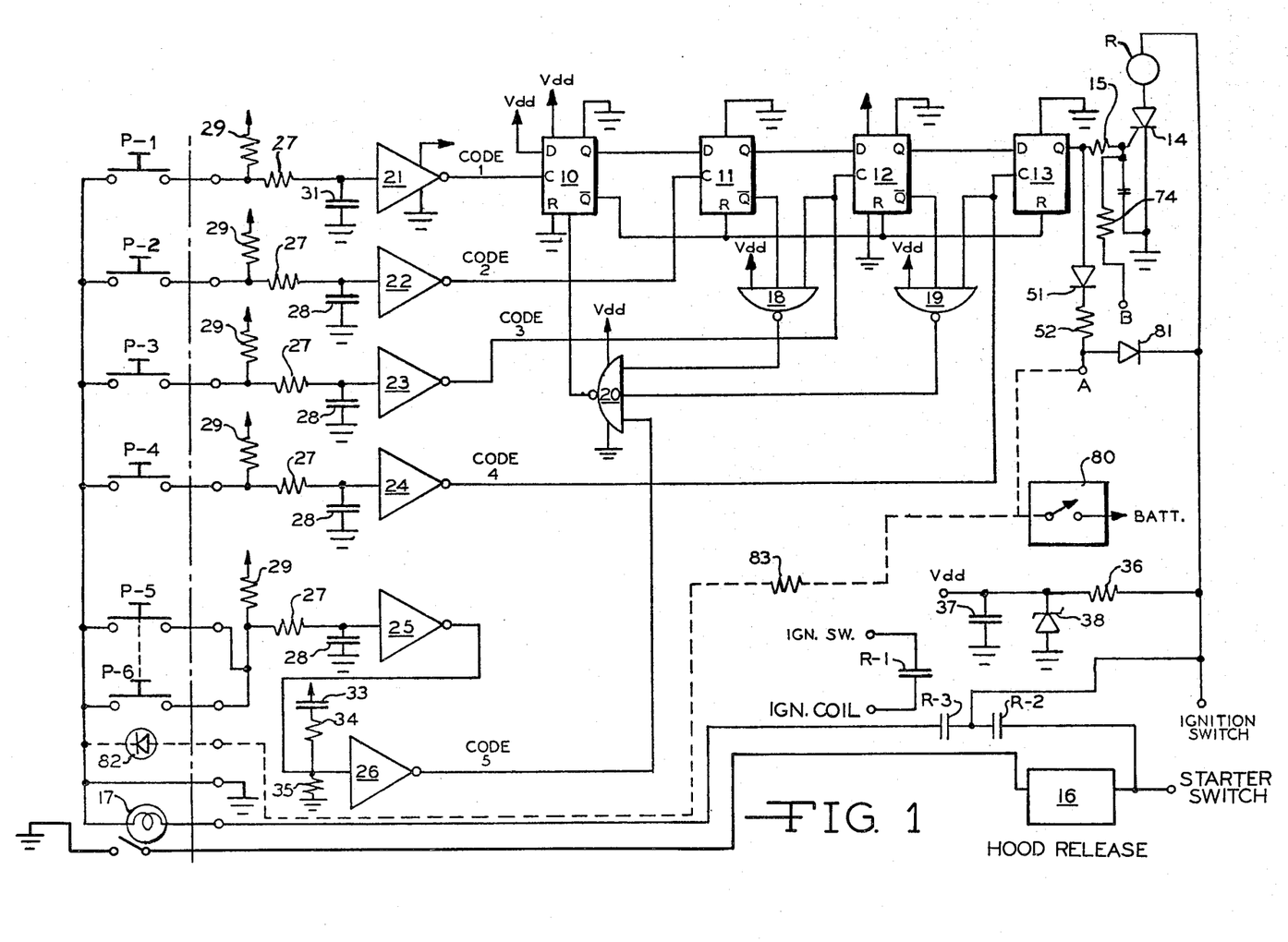
FIG. 1 is a schematic wiring diagram of an automotive anti-theft device embodying principles of the present invention.

Referring now to FIG. 1 of the drawings, there is shown therein four type D flip-flops 10, 11, 12 and 13 arranged to pass a signal sequentially one to the other when properly clocked. Each flip-flop has an input terminal D, a clocking input C, a reset input R, a Q output of the same polarity as the D input when clocked, and a $\bar{Q}$ output of the opposite polarity from the Q output. The Q output of the flip-flop 10 is connected to the D input of flip-flop 11; the Q output of flip-flop 11 is connected to the D input of flip-flop 12; and the Q output of flip-flop 12 is connected to the D input of flip-flop 13. The Q output of flip-flop 13 is connected to the gate of a silicon-controlled rectifier (SCR) 14 through a resistance 15, and the anode of the SCR 14 is connected in series with the coil of a control relay R located under the hood. One set of contacts R-1 of the relay R are normally open and are positioned in the feed line from the ignition switch to the ignition coil of the automobile. Alternatively the contacts R-1 can be installed in the control circuit for the starter relay. A second set of contacts R-2 are also normally open and are connected between the ignition switch and a hood unlatching actuator 16 of the automobile. A third set of contacts R-3 are normally closed and connect the ignition switch to a lamp 17 which illuminates a push button console that is located in the driver's compartment of the automobile. The console contains at least 5 switches marked P-1 and P-5, and preferably includes a plurality of other switches, one of which is marked P-6.

It is a desire of the present invention that the circuitry for operating the gate of the silicon-controlled rectifier 14 be extremely simple and foolproof. A positive 12 volts are supplied to the D terminal of flip-flop 10 from the power supply Vdd. Under normal conditions of the flip-flops, the Q outputs will be zero or ground, and the $\bar{Q}$ output of the flip-flops will be approximately 12 volts. The $\bar{Q}$ output from the flip-flop 10 is connected to the reset terminals of flip-flops 11, 12 and 13; so that flip-flops 11, 12, and 13 will be reset whenever the flip-flop 10 is reset.

Whenever the push button P-1 is depressed, a positive pulse to the conductor marked "Code-1" is transmitted to the clock input of flip-flop 10. Since a positive voltage exists on the D input of the flip-flop 10, it is transmitted to its Q output, and the $\bar{Q}$ output goes to zero to remove the reset voltage from flip-flops 11, 12 and 13. If the push button P-2 is now pushed, a positive pulse is transmitted through the conductor marked "Code-2" to the clock input of flip-flop 11 and the positive voltage from its input D is transmitted to its output Q. If push button P-3 is now pushed, a positive pulse is transmitted through the conductor marked "Code-3" to the clock input of flip-flop 12 to transmit the positive signal on its D input to its Q output. If the push button P-4 is now pushed, a positive pulse is transmitted through the conductor marked "Code-4" to the clock input of flip-flop 13 to transmit the positive signal on its D input to its Q output. This positive signal is then transmitted through the resistor 15 to the gate of the silicon-controlled rectifier 14 to actuate the control relay R, and thereby energize the ignition system, energize the hood unlatching actuator 16 and open the contacts R-3 to turn off the lamp 17.

According to one aspect of the invention, simple logic means are provided in combination with the flip-flops 10 through 13 for detecting an improper sequence of actuating codes 1–4, and for detecting the actuation of one of the other push buttons of the console. These functions are accomplished by three NAND gates 18, 19, and 20 each having 3 inputs and one output. The positive Vdd voltage is applied to one input of the NAND gate 18; the $\overline{Q}$ output of flip-flop 11 is connected to another of the inputs of NAND gate 18; and the clock input of flip-flop 12 is connected to the third input of the NAND gate 18. The NAND gate 19 is arranged similarly with the positive Vdd voltage being applied to one of its inputs; the $\overline{Q}$ output of flip-flop 12 being supplied to its second input; and the clock input of flip-flop 13 being applied to its third input. The output of the NAND gates 18 and 19 are connected to respective first and second inputs of the NAND gate 20; and the "Code-5" input from any of the nonused push buttons is connected to the third input of NAND gate 20. The output of the NAND gate 20 is connected to the reset terminal of the flip-flop 10, so that if one of the nonused push buttons P-5 through P-10 is pushed, or if an improper sequence is sensed by the NAND gates 18 and 19, a positive signal will be applied to the reset terminal of flip-flop 10 to reset all of the flip-flops, and thereby prevent a signal from being transmitted to the gate of the silicon-controlled rectifier 14. It will be seen that this resetting positive output of the NAND gate 20 is caused whenever a non-positive input signal is applied to one of its inputs. Normally, the NAND gate 18 will have a zero input from the clock terminal of flip-flop 12, so that the output of NAND gate 18 will normally be positive. The same is true of the NAND gate 19, since the clock input of the flip-flop 13 will normally be zero. If the push buttons P-1 and P-2 are the only push buttons pushed, and they are pushed in the proper sequence, the Q output from flip-flop 11 will be zero before a positive "Code-3" pulse is received on the third input of NAND gate 18. If, therefore, the buttons P-1, P-2, P-3 are pushed in proper order, there will always be one zero input to NAND gate 18 causing a high output from NAND gate 18. Similarly, if P-1, P-2, P-3 are pushed in proper order before P-4 is pushed, a zero input from the Q output of flip-flop 12 will be applied to the center input of the NAND gate 19, before a positive pulse from P-4 is applied to the third input of NAND gate 19. This will maintain its output high; and therefore, if the four codes are pushed sequentially in proper order, a zero output will occur on the output of NAND gate 20, and the flip-flops will not be reset. It will be seen, therefore, that a very simple arrangement is provided for detecting any improper sequence of pushing the 4 buttons of the console that are utilized as actuating buttons, and that the pushing of any "dummy" buttons in the console will automatically reset all flip-flops to prevent further advance of a positive signal through the series connected flip-flops to the silicon-controlled rectifier 14.

In some instances, the push buttons may be connected directly to the conductors marked Code-1, Code-2, Code-3, Code-4 and Code-5; but in the preferred embodiment, the push button signals are filtered and fed to Schmitt trigger inverters 21 through 25 so that the push buttons merely serve as grounding switches. In order that the inverters will normally have a zero output, power is normally supplied to their input through time delay circuits that are identical for the push buttons P-2 through P-6. The time delay circuits comprise a series resistor 27, respective ones of which are connected between the respective push button and the input of the respective inverter input and capacitor 28 connected between the inverter input and ground. A positive voltage Vdd is supplied to each of the resistors 27 through a smaller resistor 29, so that when the circuit is energized, a positive voltage will be applied to the condensers 28 and input terminals of their respective inverters. When the push buttons P-2 through P-10 are pushed, to ground out the junction between the resistors 29 and 27, a short time delay occurs during which the capacitors 28 are being discharged and before the inverters are actuated. The time delay circuit between the push button P-1 and the inverter 21 is similarly constructed but utilizes a capacitor 31 of greater capacity than capacitors 28. A longer time is required for the capacitor 31 to bleed down than is required for any of the capacitors 28. It will, therefore, be seen that if the push buttons P-1 through P-4 were pushed simultaneously, Codes 2 through 4 would be actuated ahead of Code-1, so that the flip-flops would be reset at the time Codes 2, 3, or 4 become actuated.

It will be seen that the output of the inverter 25 is normally at ground or zero and that a positive signal is required for the Code-5 input of NAND gate 20. The inversion is easily accomplished by passing the output of inverter 25 to the input of another inverter 26. Inverter 26, however, performs another function in that it, in combination with a small circuit about to be described, will automatically reset the flip-flops 10 through 13 whenever the power is turned on. This is accomplished by feeding a Vdd voltage through a capacitor 33 and series resistor 34 to the input of the inverter 26. A large resistor 25 is connected between the input and ground, to provide a charging path for capacitor 33. A positive voltage is applied on the input to inverter 26 temporarily when the ignition switch is turned on. A positive potential on the input of the inverter 26 causes its output to go low, and a low Code-5 input to NAND gate 20 causes a positive output to be applied on the reset of flip-flop 10 to automatically reset all of the flip-flops. As soon as capacitor 33 becomes fully charged, however, ground potential reaches the input of the inverter 26 causing its output to go high, thereby removing the reset signal from the output of NAND gate 26. Capacitor 33 and resistors 34 and 35 are so sized that their time constant is greater than the time constant for capacitor 31, so that even if transients would set off the flip-flops 10 through 13, the flip-flops would automatically be reset immediately following, because of the longer time required for charging capacitor 33.

Power supply Vdd is energized by the ignition switch through a filter circuit comprising a resistor 36, and a capacitor 37 that is connected between the output of the resistor 36 and ground to filter out transients. The output of the resistor 36 is clamped at 13 volts by a Zener diode 38 that is connected between its output and ground.

It is a feature of the circuitry so far described, that the push button switch console comprising the push button switches P-1 through P-6 and four others are located in the driver's compartment, and that the remainder of the electronic circuitry is located under the hood which is normally locked. The switches of the console are connected to the circuitry that is under the hood by individual wires having terminals under the hood which can be easily switched by the purchaser from one of the inverter inputs 21 through 25 to another, so that the purchaser makes up his own code, and only he knows the code.

Limited access to the automobile must be given at times, as for example, when the automobile is to be parked by a parking lot attendant. This is accomplished by the valet module shown in FIG. 2 of the drawings.

Figure 2:
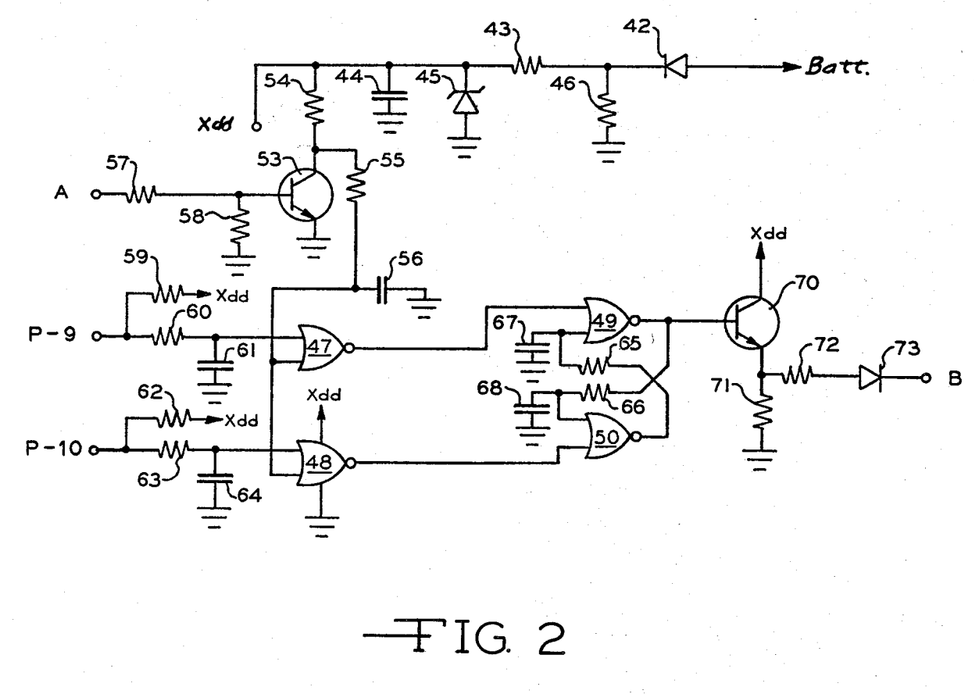
FIG. 2 is a schematic wiring diagram of circuitry that is connected to the terminals A and B of FIG. 1 and which will permit the vehicle to be actuated under limited conditions once the proper code has been entered into the circuitry.

The valet module shown in FIG. 2 has its own power supply which is independent of the ignition switch of the automobile. Power directly from the battery passes through a diode 42 through a resistor 43 to the Xdd terminal from which the power supply for the various valet module components is taken. A capacitor 44 to ground filters out transients, and a Zener diode 45 is connected between the output of resistor 43 and ground to prevent the Xdd output from exceeding 13 volts. Another resistor 46 is connected between the input of the resistor 43 and ground.

The valet module comprises four NOR gates 47, 48, 49, and 50, with the NOR gates 47 and 48 each having one input that comes from the terminal A of FIG. 1. Terminal A receives its signal from the Q output of flip-flop 13, through diode 51 and resistor 52. After the computer module of FIG. 1 has been actuated with the correct code, positive voltage will appear at the terminal A. This positive signal is converted to a ground signal by the transistor 53. Normally, i.e. before the correct code is punched into the computer module, a positive signal will be applied to the lower input of the NOR gates 47 and 48 from the Xdd voltage through resistors 54 and 55, the terminal between which is connected to the collector of transistor 53. A capacitor 56 is connected between the output of the resistor 55 and ground to provide a time delay so that whenever the power supply is connected to the battery, the positive signal applied to the bottom input of the NOR gates 47 and 48 is delayed. When the computer module is properly actuated, the positive voltage at A is communicated to the base of transistor 53 through resistor 57 to turn transistor 53 on, thereby grounding out the bottom inputs of NOR gates 47 and 48. A resistor 58 is connected between the base of transistor 53 and ground. A positive voltage is normally supplied to the top input of the NOR gate 47 from the power supply Xdd through an RC filter network comprising series resistors 59 and 60, with capacitor 61 being connected between the output of resistor 60 and ground to provide a time delay. A positive voltage is normally also supplied to the top input of NOR gate 48 through a similar RC network comprising the series resistors 62 and 63 with the capacitor 64 being connected between the output of the resistor 63 and ground. The junction between resistors 59 and 60 is connected to a normally open push button switch P-9 of the push button console, and the junction between resistors 62 and 63 is connected to an override push button switch P-10 of the push button console.

It will now be seen that when the proper code has been fed to the computer module, the voltage at A will produce a zero voltage on the bottom input of NOR gates 47 and 48, while a positive signal will be provided on the top inputs of NOR gates 47 and 48. This will normally cause a zero output voltage to exist on the outputs of the NOR gates 47 and 48.

NOR gates 49 and 50 are connected in a flip-flop configuration. The output of NOR gate 47 is connected to the top or "clear" input of NOR gate 49, while the output of NOR gate 48 is connected to the bottom or "set" input of NOR gate 50. The output of NOR gate 50 is connected to the bottom input of NOR gate 49, while the output of NOR gate 49 is connected back into the top input of NOR gate 50. A capacitor 67 is connected between the bottom input of NOR gate 49 and ground, and a capacitor 68 is connected between the top input of NOR gate 50 and ground; so that the capacitor 67 and resistor 65 provide a time delay function for the input of NOR gate 49; and the capacitor 68 and resistor 66 provide a time delay function for the top input of NOR gate 50. The output of NOR gate 49 is what will be called the Q output of the flip-flop, and it is connected to the base of output transistor 70 whose collector is connected to the Xdd power supply, and whose emitter is connected to ground through resistor 71. Transistor 70 is connected in an emitter follower configuration, and the signal from its emitter is connected through resistor 72, and diode 73 to the B terminal of the computer module of FIG. 1. The B terminal of FIG. 1 is connected through resistor 74 to the gate of SCR 14 to cause the SCR 14 to always be energized whenever the valet module is actuated. The valet module is actuated by pushing the override push button P-10 whenever a signal exists at the terminal A and this causes a grounding out of the top input to the NOR gate 48 to in turn produce a positive signal on the lower set input of NOR gate 50 to cause its output to go to ground. This ground signal from the $\overline{Q}$ output of NOR gate 50 is applied to the bottom input of NOR gate 49, and since a zero signal is normally applied to the top "clear" input of NOR gate 49, a positive output is produced by the NOR gate 49 which turns transistor 70 on to in turn produce a positive voltage on the terminal B. Since the valet module applies a positive voltage to the gate of the SCR 14, the ignition switch can now be turned on and off by a parking attendant to stop and start the automotive vehicle until such time as the normal push button P-9 is actuated. When the push button P-9 is actuated, a ground signal is applied to the top input of the NOR gate 47 and since the bottom input of NOR gate 47 at this time is also grounded, a positive output is produced from the output of the NOR gate 47; and since the bottom input or NOR gate 47 at this time is also grounded, a positive output is produced from the output of the NOR gate 47. This positive pulse is transmitted to the top of the "clear" input of NOR gate 49 which causes its output to go low to de-energize transistor 70 and hence to de-energize the terminal B of the computer module. Since the power supply for the computer module receives its power supply from the ignition switch, the computer module was already reset the first time the ignition switch was turned off; and so, if the ignition switch is now either off or turned off, power flow through the SCR 14 will cease. Thereafter, it will again be necessary to close the switches of the push button console in proper sequence to restart the automobile. The time delay caused by capacitor 64 and resistor 63 is short compared to the time delays caused by capacitor 61 and resistor 60, and capacitor 56 and resistor 55. This assures that the valet module reverts back to the override mode in the event that the power supply to the valet module is interrupted and then restored, i.e. if the automobile is left at a service station for battery replacement.

In some instances, it may be desirable to replace the function of the valet module of FIG. 2 with a simple override switch 80 hidden underneath the dash of the automobile. The override switch will be a normally open switch powered up directly from the battery and communicated to the terminal A of the computer module. If the override switch 80 is closed at the time the SCR 14 is operating, power will be maintained from the battery through switch 80, diode 81 and through the anode of the SCR 14, so that a steady flow of current will continue through the SCR 14 even though its gate has been returned to ground by a resetting of the computer module. This allows a parking lot attendant to continue operating the automotive vehicle until such time as the override switch 80 is again opened, at which time current flow through the SCR 14 will cease. Thereafter, it will again be necessary to energize the gate of the SCR 14 by a proper coding of the computer module before the SCR 14 can again be turned on.

In some instances, it may be desirable to provide a lamp indication of when the override is closed. This can be easily accomplished by a light emitting diode 82 on the console with the cathode of the LED 82 being connected to ground and the anode of the LED 82 being connected to the output of the override switch 80 through resistor 83.

A time delay is provided by resistor 65 and capacitor 67, as well as by resistor 66 and capacitor 68 in the feedback circuits of the flip-flop formed by NOR gates 49 and 50 to reduce the possibility of their being actuated by high frequency transients. The "set" and "clear" signals of the flip-flop must be maintained long enough for the RC networks to charge and discharge the flip-flop before a permanent change occurs in the output Q of the flip-flop circuit.

Figure 3:
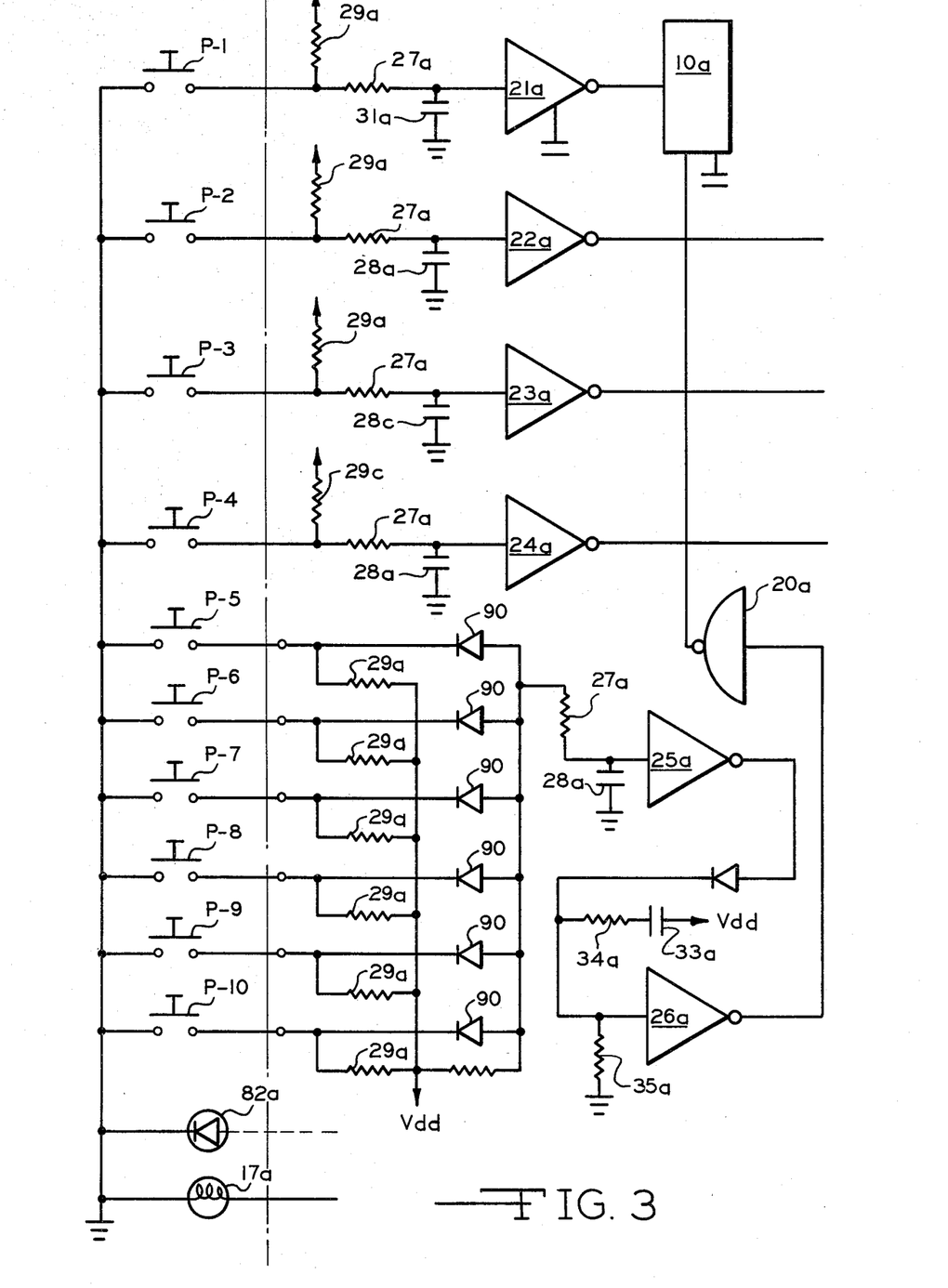
FIG. 3 is a schematic wiring diagram of a portion of another embodiment of the invention, showing that portion that is different from that shown in FIG. 1.

The embodiment shown in FIG. 3 corresponds to the embodiment previously described excepting for the circuitry connecting the switches P-5 through P-10 to the flip-flop circuitry and either one of which when depressed will reset the flip-flops 10 through 13. In the embodiment shown in FIG. 3, a would be thief can not measure the voltages, resistances, or capacitances of the conductors leading from the respective switches through the firewall and determine which switches are the code switches. Those portions of the embodiment of which FIG. 3 is a part are designated by a like reference numeral characterized further in that a suffix "a" is affixed thereto.

In the embodiment shown in FIG. 3, a diode 90 is installed in the circuitry under the hood, in each of the conductors leading to the switches P-5 through P-10, so that the resistance across any one of the conductors will be infinite, just as is the resistance of the conductors leading from the switches P-1 through P-4. Analysis of the conductors leading from the ten switches therefore will not reveal which of the switches must be depressed in a proper order, and which switches will reset the circuitry.

Figure 4:
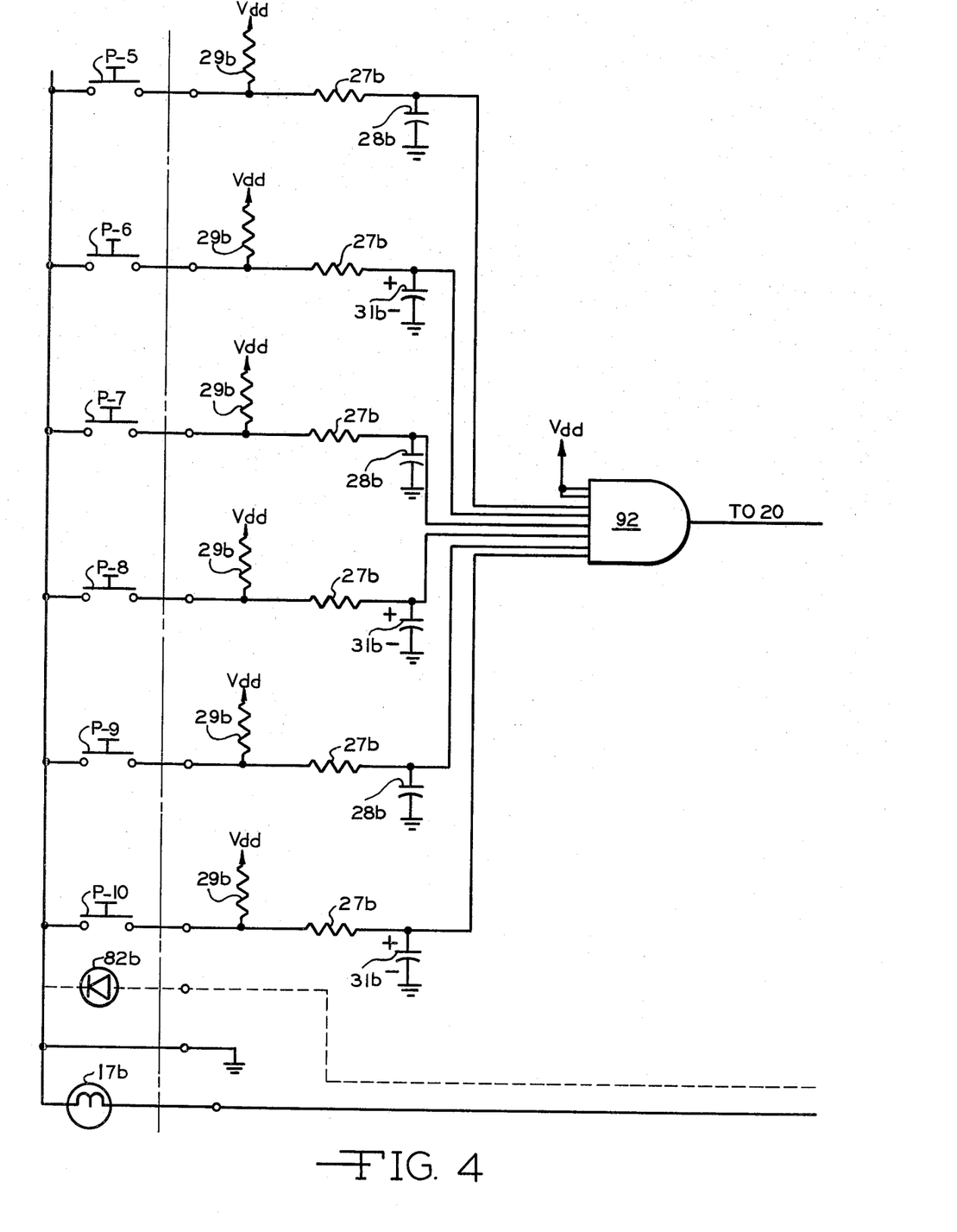
FIG. 4 is a schematic wiring diagram of a portion of still another embodiment of the invention that is different from that shown in FIG. 1.

In the embodiment of the invention covered by FIG. 4 of the drawings, the conductors leading from the switches P-5 through P-10 are isolated from each other by having each of the conductors going to one of the inputs of an eight input AND gate 92. Two of the inputs to the AND gate 92 are connected directly to the Vdd voltage, so that normally all inputs are supplied with the same Vdd voltage, and so that the output of the AND gate will normally supply a positive voltage to the NAND gate 20 to which it is connected. Those portions of the embodiment shown in FIG. 4 which correspond to portions of the embodiments previously described are designated by a like reference numeral characterised further in that a suffix "b" is affixed thereto.

In the two previously described embodiments, a larger capacitor 31 or 31a as the case may be, is used in the conductor between switch P-1 and the Schmitt trigger 21, than is used in the conductors from the other switches in order to provide a time delay which causes the flip-flops to be reset if the switches P-1 through P-4 are closed simultaneously. By checking the capacitance of the various conductors, a would be thief can discover that one of the switches is different from the others. In the embodiment of FIG. 4, the leads from switches P-6, P-8 and P-10 are connected to ground with individual capacitors having the same value as capacitor 31, so that four switch leads will exibit the capacitance of capacitor 31. The inputs of a CMOS AND gate have the same resistances, capacitances etc. as do the inputs to a CMOS Schmitt trigger, so that the measuring of the resistance, capacitance and voltage of their input will not reveal what the component is.

While the invention has been described in considerable detail, we do not wish to be limited to the particular embodiments shown and described, and it is our intention to cover hereby all novel adaptations, modifications and arrangements thereof which come within the practice of those skilled in the art to which the invention relates.

We claim:

1. An antitheft system for a vehicle having a latch secured compartment and an operator compartment with a key control switch therein, said system comprising: a logic circuit having at least five inputs and an output that is energized when a predetermined four inputs are actuated in a predetermined order; a control relay; a control switch in series circuit with said key control switch, and said control relay; said control switch being of a type which when actuated holds in a current conducting condition until flow therethrough ceases; a valet circuit powered independently of said key control switch; a valet control switch in said valet circuit; said valet circuit having an input connected to the output of said logic circuit, and an output for actuating said control switch; said valet circuit being constructed and arranged when actuated by said logic circuit and said valet switch is closed to hold said control switch in its actuated condition even though said key control switch is opened.

2. In a security system of the type having a plurality of switches which supply signals to an electronic discriminating circuit which when received in proper sequence provides an unlocking output signal, four code providing switches, at least two non-code providing switches, first means having four clocking inputs which must be energized in a predetermined sequence and a reset input, four Schmitt trigger type devices respective ones of which are connected to respective clocking inputs, four circuits respective ones of which connect respective code providing switches to said respective Schmitt trigger type devices, each of said four circuits having a resistance of equal value therein, said circuits being connected to ground by condensers with at least three of said condensers being of substantially the same value, second means having a resistance and a Schmitt trigger type device connected in series to said reset input of said first means and having respective inputs from said non-code providing switches which are isolated from each other, said resistance of said second means being of the same value as in one of those in said four circuits, and having a condenser connected to ground that is seen by said non-code switches that is of a capacitance of one of said first and second values.

3. The system of claim 2 wherein said second means comprises an AND gate.

4. The system of claim 2 wherein said second means comprises diodes in its respective inputs, while said reset output is provided by the joint output of said diodes.

5. In a security system of the type having a plurality of switches which supply signals to an electronic discriminating circuit which when received in proper sequence provides an unlocking output signal, four code providing switches, at least two noncode providing switches first means having four clocking inputs which must be energized in a predetermined sequence and a reset input, each of said four clocking inputs having a respective Schmitt trigger connected thereto, four circuits respective ones of which connect respective code providing switches to respective Schmitt triggers, each of said four circuits having a resistance of equal value therein, three of said circuits being connected to ground by condensers of a first value and a fourth of said circuits being connected to ground by a condenser of a second greater value, second means having respective inputs for said noncode providing switches and which isolates said inputs from each other, and providing a reset signal to said first means, said second means having a resistance of the same value as the resistance in one of said four circuits and which is seen by said noncode switches, and having a condenser therein connected to ground that is seen by said noncode switches that is of a capacitance of one of said first and second values.

6. The system of claim 5 wherein said second means comprises an AND gate having separate input circuits for each noncode providing switches, said separate input circuits each having one of said resistances and condensers therein.

7. The system of claim 6 wherein there are at least two input circuits to said AND gate having sufficiently different condensers therein to give a negative pulse on the output of said AND gate when the AND gate is first energized.

8. The system of claim 5 wherein said second means comprises diodes that are respectively connected to said noncode providing switches, said second means further including said resistance and first and second inverting Schmitt triggers all connected in series with said resistance being connected to the output of all diodes, and the output of said second Schmitt trigger being connected to said reset input of said first means.

9. The system of claim 8 wherein the connection between said first and second Schmitt triggers is supplied with power through a power up condenser and wherein said connection is also connected to ground through a pull down resistance, said power up condenser and pull down resistance being sized to actuate said second Schmitt trigger before said first Schmitt trigger when both are energized.

10. An anti-theft device for a vehicle having on-off means for enabling and disabling the vehicle, said device comprising: a control switch for controlling said on-off means; first, second, third, and fourth D-type flip-flops, each having a D input, at least one output, and a clocking input, with an output of said first being connected to the D input of said second, an output of said second being connected to the D input of said third, an output of said third being connected to said D input of said fourth, and an output of said fourth being connected to said control switch; said flip-flops being arranged to turn said control switch on when they are clocked sequentially; first, second, third and fourth code producing switch means which when actutated inturn actuate respective clocking inputs of said flip-flops; at least one other non-code producing switch means; a first multiple input gate receiving signals from said outputs of said second flip-flop and said clocking input of said third flip-flop; a second multiple input gate receiving signals from an output of said third flip-flop and said fourth switch means; and a third multiple input gate receiving input signals from the outputs of said first and second multiple input gates and said other switch means, the output of said third multiple input gate providing a reset signal for said flip-flops; first, second, third and fourth Schmitt trigger type devices connected between respective first, second, third and fourth switch means and their respective clocking inputs of said flip-flops which they actuate; said switch means being connected to said Schmitt trigger type devices through respective input resistances that are all of approximately the same resistance, said inputs of said Schmitt trigger type devices being connected to ground by respective condensers with the condensers that are connected to said second, third and fourth Schmitt trigger type devices being of substantially the same value, said device including a multiple input AND gate and there being at least two non-code producing switches, said non-code producing switches being connected to respective inputs of said AND gate by respective resistances and condensers having substantially the same values as those connected to said code producing switches, and the output of said AND gate supplying an input signal to said third multiple input gate.

11. An anti-theft device for a vehicle having on-off means for enabling and disabling the vehicle, said device comprising: a silicon controlled rectifier for controlling said on-off means; first, second, third, and fourth D-type flip-flops, each having a D input, at least one output, and a clocking input, with an output of said first being connected to the D input of said second, an output of said second being connected to the D input of said third, an output of said third being connected to said D input of said fourth, and an output of said fourth being connected to said silicon controlled rectifier; said flip-flops being arranged to turn said silicon controlled rectifier on when they are clocked sequentially; first, second, third and fourth code producing switch means which when actuated inturn actuate respective clocking inputs of said flip-flops; at least one other non-code producing switch means; a first multiple input gate receiving signals from said outputs of said second flip-flop and said clocking input of said third flip-flop; a second multiple input gate receiving signals from an output of said third flip-flop and said fourth switch means; and a third multiple input gate receiving input signals from the outputs of said first and second multiple input gates and said other switch means, the output of said third multiple input gate providing a reset signal for said flip-flops; first, second, third and fourth Schmitt trigger type devices connected between respective first, second, third and fourth switch means and their respective clocking inputs of said flip-flops which they actuate, and a fifth Schmitt trigger type device connected between said other non-code producing switch means and said third multiple input gate; said switch means being connected to said Schmitt trigger type devices through respective input resistances that are all of approximately the same resistance, said inputs of said Schmitt trigger type devices being connected to ground by respective condensers with the condensers that are connected to said second, third and fourth Schmitt trigger type devices being of substantially the same value, and the condenser that is connected to said fifth Schmitt trigger type device being substantially of the same value as that connected to one of the other Schmitt trigger type devices; valet means, a valet actuation switch, and a return to normal switch, said valet means being constructed and arranged to supply a hold voltage to the gate of said silicon controlled rectifier, said valet means being enabled when said logic means energizes the gate of said silicon controlled rectifier and said valet actuation switch is actuated, said valet means being dissabled when said return to normal switch is actuated.

* * * * *